Feb. 19, 1952            H. SCHNEIDER            2,585,968
TURBOSUPERCHARGED INTERNAL-COMBUSTION ENGINE
HAVING HYDRAULIC MEANS TO CONNECT TURBINE
TO ENGINE OUTPUT SHAFT AT HIGH LOAD
Filed Feb. 21, 1944            3 Sheets-Sheet 1
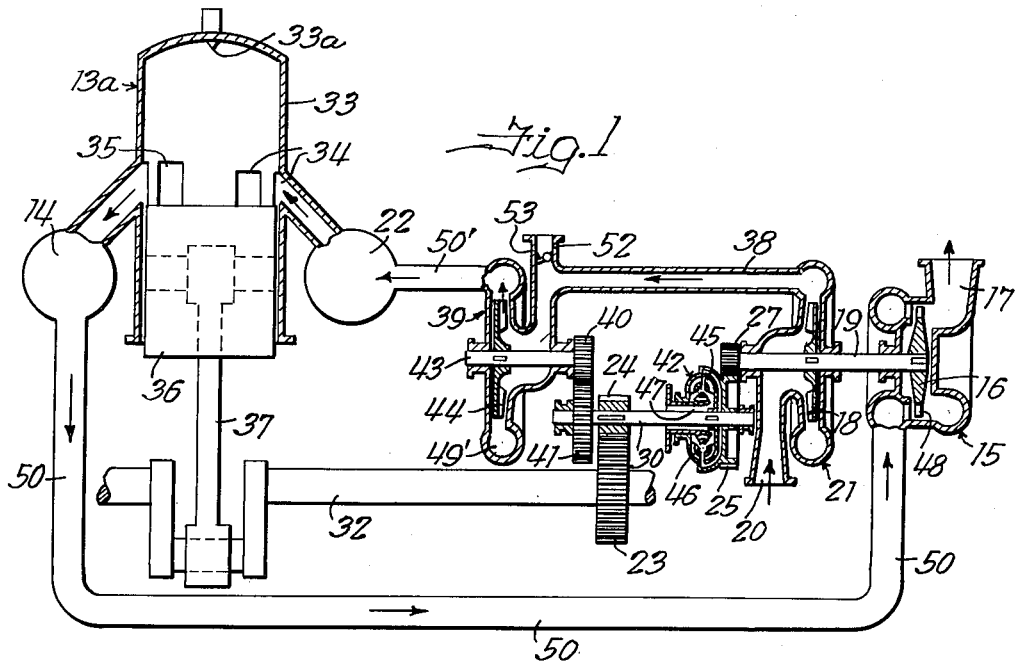
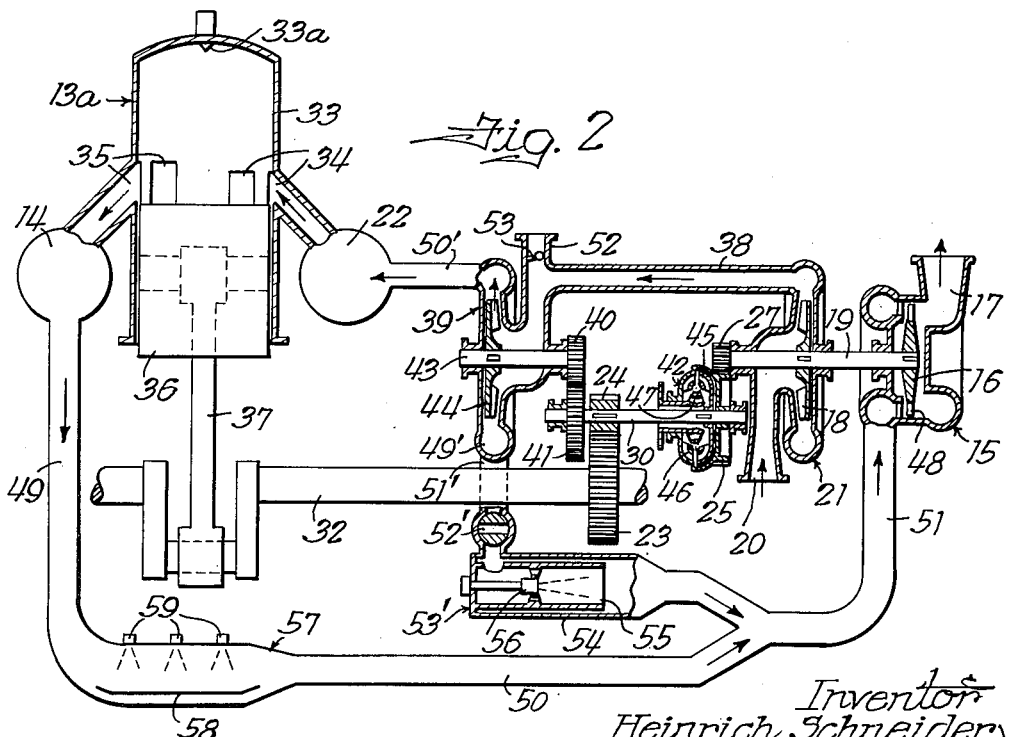
Inventor
Heinrich Schneider

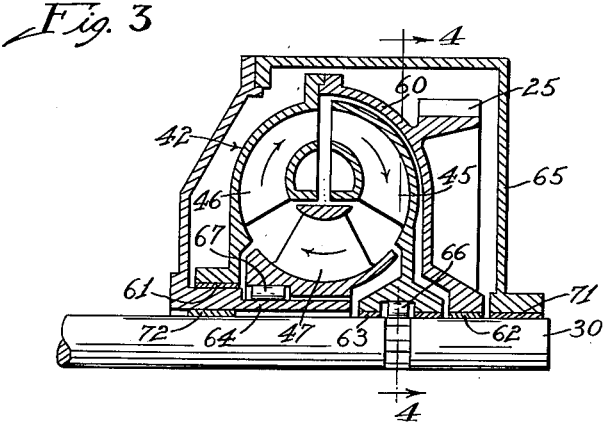
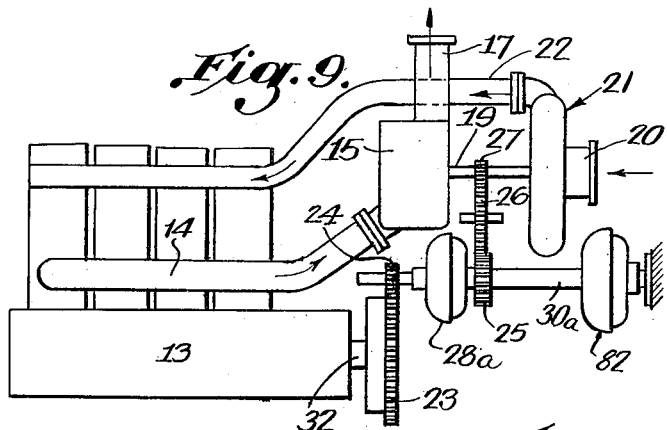
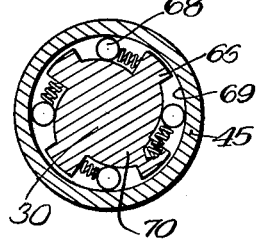
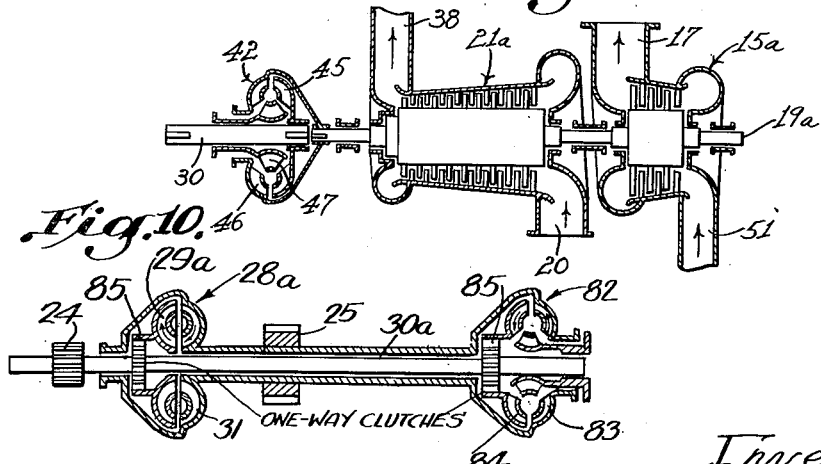

UNITED STATES PATENT OFFICE 2,585,968

TURBOSUPERCHARGED INTERNAL-COMBUSTION ENGINE HAVING HYDRAULIC MEANS TO CONNECT TURBINE TO ENGINE OUTPUT SHAFT AT HIGH LOAD

Heinrich Schneider, Hamilton, Ohio, assignor to Schneider Brothers Company, Hamilton, Ohio, a copartnership Application February 21, 1944, Serial No. 523,193

3 Claims. (Cl. 60—13)

This invention relates to internal combustion engines and gas turbines, and their combination for supercharging internal combustion engines by exhaust gas turbines, driving air compressors, and delivering power from the turbine to the engine shaft.

The principal object of the present invention is to improve the present state of the art by combining the advantageous features of the most efficient and most highly developed types of engines, turbines, and air compressors and by providing new means to operate them in the most efficient combination.

This invention is applicable to diesel, gas, and gasoline engines of the two and four cycle type, although I have confined the following description of the invention to its application to two cycle diesel engines, whereby to avoid duplication and too lengthy specification.

An ideal power plant should be able to develop the power at constant output shaft speeds, at full and part loads, at low fuel consumption, and, also, at variable speeds when used in transportation equipment. It should do this at low speeds, also. Such a power plant should be able to develop excessive overload power for emergencies, and for short duration where a fuel consumption increase would be tolerated so long as it would not materially affect the average consumption over long operation periods.

The present invention provides the means and the methods to produce such an ideal power plant by combining the internal combustion engine with a gas turbine, and air compressors or blowers, and by providing new means for interconnecting these units.

When the blower, which term shall be understood to include any type of air compressor, has a single ratio driving connection with the output shaft of the power plant, in most cases the engine shaft, the blower pressure at a certain engine speed has a fixed value which changes insignificantly with the load changes at this speed, and the power consumed by the blower is substantially constant. I include in this driving connection hydraulic coupling drives which in operation permit only a very small percentage of speed variation, and only during starting give high slip. With high supercharging, the power absorbed by the blower is a high percentage of the engine power at full load, and it can easily be seen that at part and low loads of the power plant at the same speed, the fuel consumption will be excessively high because of the power absorbed by the blower. The same is the case with the internal combustion turbine, where the power to drive the blower may be 80% of the total gas turbine power at full load, the percentage increasing at part loads. In such a gas turbine the blower absorbs about three times the effective shaft output power of the gas turbine power plant at full load.

It should be clear that in order to reduce the fuel consumption at part load, the power absorbed by the blower should be reduced, and that can only be done efficiently if the speed of the blower is reduced, thereby reducing pressure and delivery volume, or both. To avoid confusion, for the present let it be assumed that the blower is of the centrifugal type, although the relation described here will also apply more or less to the axial, rotary, and piston type blowers.

The two cycle engine needs a scavenging blower that is driven by the crankshaft. The engine-driven blower has to furnish enough air during starting and accompanied low speed so that good starting is insured, and serves as one stage of the supercharger to increase the pressure of the air to provide high pressure supercharging. Therefore, this blower is not just an auxiliary means but one of the substantial parts of the power plant, and will absorb a substantial amount of power. With increased high supercharging the exhaust gas turbine power increases rapidly and soon there is excess power available on the turbine shaft not used to drive its first stage blower.

In accordance with my invention full use is made of this excess turbine power by connecting the turbine shaft with the engine shaft by means of a hydraulic automatically variable torque converter, which allows a speed increase of the turbine shaft corresponding with the increase of the turbine power at constant engine shaft speed, and which transmits the excess torque of the turbine to the engine shaft at different speed ratios of turbine shaft to engine shaft. The converter impeller is driven by the gas turbine and the hydraulic turbine of the converter transmits drive to the engine shaft through a gear train.

Connecting the turbine compressor of a gas turbine power plant by means of a variable speed ratio transmission device, like the hydraulic torque converter, to the output shaft, makes it possible to increase the turbine compressor speed with the increased power output of the gas turbine, and, at decreased output, to decrease the blower speed in connection with a constant speed output shaft. The use of a torque converter, therefore, makes possible a reduction in the excessive fuel consumption of a gas turbine at part loads, that being particularly significant, for example, in a gas turbine alternating current generator set operating frequently at part load.

The engine preferably used with my invention has port scavenging and port exhaust cylinders with a simple cylinder head provided with a fuel injection valve. The engine is designed so that it can stand high supercharging, with piston weights to appropriately balance the gas pressure. The ports for scavenging and exhaust are large, and all the conduits for the air and the exhaust gases are streamlined as much as possible so that the engine can operate with highest speed and lowest resistance to the flow of air through the engine. My copending patent applications, Serial Nos. 519,473 and 521,605, which resulted in Patents 2,393,341 and 2,393,342, issued on January 22, 1946, referring to scavenging, relate to these last mentioned features. In order to pass air through the engine with least resistance and to get more air through than with the previous engine designs, I have dispensed with intake valves and exhaust valves, and with other special devices trapping the air in the cylinder. These devices all tend to restrict the free-flow and limit the operating speed of the engine.

Another feature of my invention is to have increased supercharging used with increased engine speed in order to have the inertia forces of the piston and connecting rods efficiently balance the compression and gas pressures in the engine over a large range of supercharging pressure variation. In that way bearing friction losses are reduced and fuel consumption is decreased over a large range of power output. This feature is particularly valuable in engines for transportation equipment, wherein increased power output is required with increased speed.

In accordance with another important feature of my invention, I retain the most efficient balance of the piston inertia forces at different speeds with the gas pressure in the cylinder with increasing supercharging pressures, by providing a pressure speed control in which the supercharging pressure controls or limits the engine speed by acting on the engine governor in a similar manner as speed control is effected by the pressure in air compressors driven by turbines.

The foregoing and other objects and advantages of the invention will be apparent from the following description, in which reference is made to the accompanying drawings illustrating several embodiments of the invention, in which Figs. 1 and 2 show diagrammatically an internal combustion power plant made in accordance with my invention, Fig. 2 differing from Fig. 1 in the addition of two combustion chambers;

Fig. 3 is an enlarged section through the torque converter of Fig. 2;

Fig. 4 is a cross section through the one-way clutch of the converter taken on line 4—4 of Fig. 3;

Fig. 5 is a longitudinal section through a multiple stage gas turbine and a multiple stage axial blower connected by means of a torque converter with the output shaft;

Fig. 9 shows a diesel engine with an improved combination of supercharger and scavenging means provided in accordance with my invention, and Fig. 10 is a section of the hydraulic coupling and converter of Fig. 9.

The same or similar reference numerals are applied to corresponding parts in these views.

Figure 6:
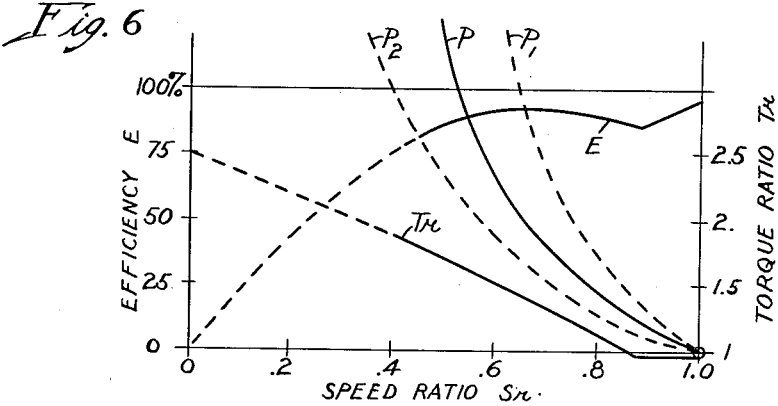
Fig. 6 shows the characteristic curves of the converter.

Referring to the drawings, Fig. 2 shows diagrammatically one cylinder 33 of a multi-cylinder two cycle diesel engine 13a, having intake ports 34 and exhaust ports 35. The piston 36 has a connecting rod 37 attached to and driving the crankshaft 32. Fuel is injected into the cylinders 33 through a nozzle 33a. Intake air manifold 22 supplies the cylinders 33 with scavenging and supercharging air, and the cylinders are arranged to exhaust into the exhaust manifold 14. An exhaust turbine 15 directly drives a blower 21, which receives air from the atmosphere through intake 20, and discharges compressed air through pipe 38 into the intake of a second blower 39, which further compresses the air and discharges it into the intake manifold 22. Both blower shafts 19 and 43 have driving connections with the crankshaft 32, blower 39 by means of a single ratio gear connection 40—41, and 23, 24 and blower 21 by means of a hydraulic automatically variable torque converter 42, which provides a multiple ratio connection. Crankshaft 32 carries a gear 23 which meshes with gear 24 on intermediate shaft 30. On this shaft 30 is arranged a gear 41, which meshes with gear 40 on shaft 43, carrying the impeller 44 of blower 39. Shaft 30 is also connected with the torque converter 42, its hydraulic turbine 45 being fixed on shaft 30 and cooperating with and enclosed by the pump member 46 and also cooperating with the relatively stationary reaction member 47. The pump member 46 carries a gear 25 which meshes with gear 27 fixed on shaft 19, on which are also fixed the blower impeller 18 and the turbine wheel 16, the latter being provided with blades 48.

The exhaust gases from the exhaust manifold 14 are conducted through pipes 49, 50 and 51 to the exhaust turbine 15 and flow through the blades 48 for propulsion of the wheel 16, and escape through outlet 17 to the atmosphere.

In the discharge pipe 38, from blower 21 to blower 39, there is an inlet pipe 52, in which an automatic unbalanced butterfly valve 53 is provided so that blower 39 can take in air directly from the atmosphere when there is a reduction in pressure in pipe 38. This valve will close automatically when the pressure in pipe 38 is above atmospheric pressure. The discharge chamber 49' of blower 39 is connected by pipe 50' with the intake manifold 22 of the engine.

The discharge chamber 49' of blower 39 is connected by pipe 50' with the intake manifold 22 of the engine, and has a bypass pipe connection 51' to the gas turbine 15, in which bypass is provided a hand operated regulating valve 52' and a combustion chamber 53', with housing 54, a firechamber 55, and a fuel injection nozzle 56.

In the exhaust pipe 49—50 is arranged another combustion chamber 57, with a fire shield 58 and fuel injection nozzles 59, which arrangement permits fuel injection into the exhaust of the engine, whereby to use the excess air carried with the exhaust to further increase its heat energy to the temperature the gas turbine can carry.

The blowers in Fig. 2 are each shown diagrammatically as having one centrifugal impeller, but it will, of course, be understood that for high supercharging each of these blowers can or will be a multiple stage blower.

When the engine 13a shown in Fig. 2 has to be reversed, the torque converter 42 is emptied, so that the turbine blower 21 can operate in the same direction of rotation as when the engine runs forward. The crankshaft-driven blower 39 under such conditions reverses its direction of rotation, and it will therefore be designed for reversible engines so that it can operate in either direction reasonably efficiently. The turbine blower continues to rotate in the same direction during the reversal of the engine, due to its enertia, and facilitates the starting.

The internal combustion power plant disclosed in Fig. 1 is the same as that shown in Fig. 2, but omits the bypass connection 51" and combustion chamber 53' and also the combustion chamber 57.

Fig. 3 shows the torque converter 42, which comprises a bladed impeller 46 bolted to a housing 60 and rotatably mounted on bearings 61 and 62. The housing 60 carries the gear 25 and encloses a bladed turbine wheel 45 mounted rotatably on shaft 30 on bearings 63, and a bladed reaction member 47 rotatably mounted on sleeve 64 integral with the stationary converter housing 65. The turbine and the reaction member are provided with one-way clutches 66 and 67, like that shown in Fig. 4, having spring-pressed rollers 68, an outer cylinder member 69 corresponding to portions of 45 and 47, and an inner cam member 70 corresponding to portions of 64 and 30, of standard one-way clutch design. The one-way clutch in the reaction member 47 permits rotation of the reaction member in the direction of rotation of pump 46 and turbine 45, and holds the reaction member stationary when it is exposed to a fluid reaction in the opposite direction. The one-way clutch arranged between the turbine 45 and the shaft 30 permits the transmission of power from the turbine to the shaft, but when the shaft rotates at a higher speed than the turbine, the turbine idles on the shaft. The shaft 30 is rotatably mounted in the housing 65 in bearings 71 and 72. Hydraulic torque converters of this type are shown in my U. S. Patent 2,306,758 and copending patent application Serial No. 467,864, filed December 4, 1942, which resulted in Patent No. 2,410,185, issued October 29, 1946.

In Fig. 5 is shown a highly efficient internal combustion gas turbine, comprising a multiple stage gas turbine 15a and a multiple stage axial air compressor 21a. Its common shaft 19a drives the output shaft 30 by means of the hydraulic torque converter 42. It is intended to replace the centrifugal blower exhaust turbine unit 15—21 of Fig. 2 by this more efficient unit of Fig. 5 when most efficient operation is to be achieved with the internal combustion power plant of Fig. 2.

Fig. 6 shows the efficiency curve E of the torque converter 42, the torque ratio curve Tr, and the power curve P plotted over the speed ratio Sr. Tr equals the turbine torque divided by the pump torque, and Sr equals the speed of the turbine divided by the speed of the pump. With increasing power P transmitted by the converter 42 to a shaft of constant speed, the speed ratio Sr decreases, which means that with increasing gas turbine blower speed, the increasing excess power is transmitted to the crankshaft 32 by a lower speed ratio in the converter and with a corresponding higher torque ratio Tr. The power curve P corresponds to a certain size of converter. By changing the size of the converter, the power curve can be shifted, for example, to P1 or P2, and accordingly, the speed increase of the gas turbine blower with increasing power output can be predetermined.

Figure 7:
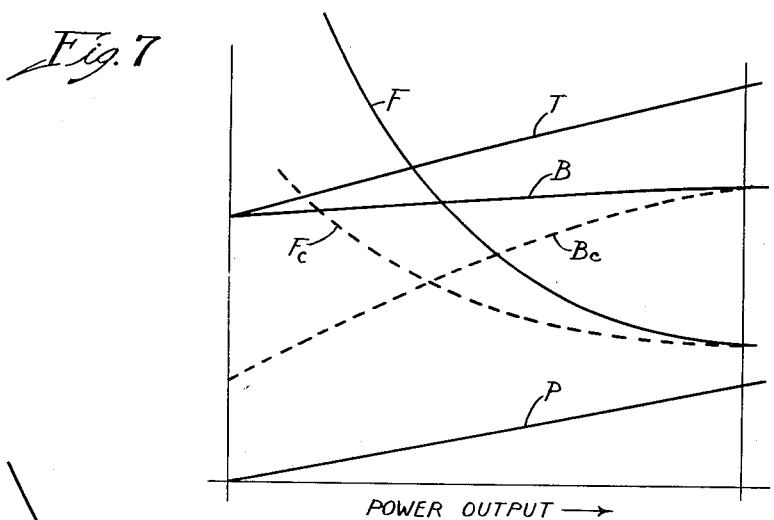
Fig. 7 shows diagrammatically the characteristic curves of an internal combustion gas turbine.

Fig. 7 pertains to a gas turbine Fig. 5; the curve T denotes the power output of the turbine 15a, and the curve B denotes the power absorbed by the air compressor 21a. The difference of the two is shown by the effective power output curve P of the gas turbine power plant plotted over the power output. The fuel consumption in pounds per brake horsepower hour of the internal combustion turbine power plant increases excessively with decreasing load, as shown by curve F. If the gas turbine drives by means of a torque converter (Fig. 5) on the output shaft, the power absorption by the air compressor could be reduced, as indicated in dotted curve Bc, and the fuel consumption would decrease accordingly, as indicated by dotted curve Fc.

Figure 8:
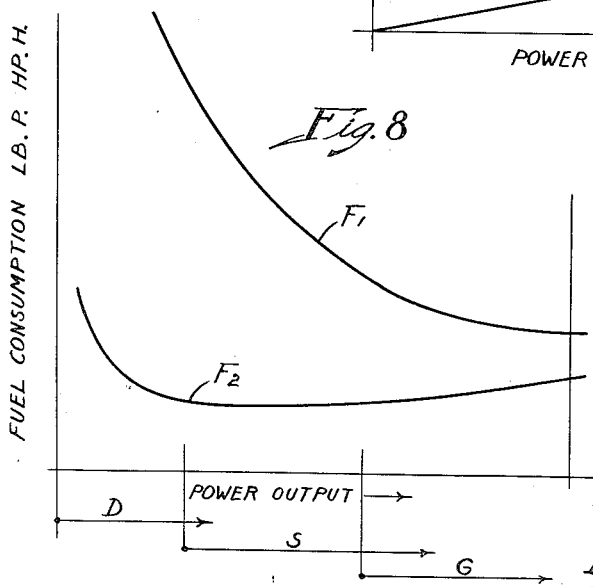
Fig. 8 shows diagrammatically the fuel consumption curves of a power plant embodying the present invention in comparison with a gas turbine power plant.

In Fig. 8 are shown the fuel consumption curve F1 in pounds per brake horsepower hour of the internal combustion gas turbine power plant and the fuel consumption curve F2 of the internal combustion engine power plant, according to the present invention, plotted over the power output or load. Over the part load range D the power, according to the invention, is produced by the diesel engine without any or with little supercharging. Over the range S the engine is supercharged with increasingly higher pressure, and excessive turbine power is delivered to the output shaft by means of the converter. The difference of the fuel consumption of the two power plants is particularly expressed at part loads where the fuel consumption of the gas turbine power plant F1 is not merely twice, but actually three and even four times as high as with the power plant F2 of the present invention. The low fuel consumption curve F2 over an extremely large power output range and the high overload capacity of my improved power plant make it particularly advantageous and practicable for use in transportation equipment.

Referring to Figs. 9 and 10, the two cycle engine 13 illustrated has a suitable exhaust pipe exhausting through the gas turbine 15 to drive a rotor therein, the exhaust then going to the atmosphere through the outlet 17. The rotor of turbine 15 drives a scavenging and supercharger blower impeller in housing 21, both being mounted on shaft 19. The blower receives air from the atmosphere through intake 20 and discharges the compressed air from the housing 21 through a suitable pipe into the cylinders of the engine 13. Shaft 19 is drivingly connected with the crankshaft of the engine by a gear train including gears 23—27, and a hydraulic coupling 28a arranged between the gears 24 and 25. The bladed wheel 29a of the coupling 28a is rotatably mounted on the shaft 30a, but the housing 31 is loosely mounted on the shaft and fixed to the gear 25. During starting and low load operation the turbine blower shaft 19 is driven from the crankshaft 32, and at high loads the turbine shaft transmits excessive turbine power through the gear train 23—27 and hydraulic torque converter 82 to the crankshaft. This driving connection between the turbine blower and the crankshaft is a variable ratio drive, and the supercharging pressure for a certain engine speed has a fixed value which cannot be changed for different loads. When the gear drive is designed for a certain supercharging at a certain engine speed, the amount of supercharging cannot, therefore, be increased nor decreased for this speed, although that would be desirable for different power output. In accordance with my invention, I have added the hydraulic torque converter 82 on an extension of the shaft 30a. The pump 83 of the converter 82 is connected with gear 25, and its turbine 84 with shaft 30a. A one-way clutch 85 like clutch 66 (Fig. 4) is provided between the shaft 30a and the turbine 84 and between the shaft 30a and the wheel 29a of the hydraulic coupling 28a. These two one-way clutches 85 freewheel in opposite directions relative to one another. The bladed wheel 29a can be driven by the shaft 30a through the one-way clutch 85, but the wheel 29a freewheels when driven by the other wheel 31 of the coupling 28a at a speed higher than the shaft speed.

During starting and part load operation, when the gas turbine 15 does not furnish all the power absorbed by the blower 21, the crankshaft 32 transmits the difference in power through the hydraulic coupling 28a to the turbo blower shaft 19, whereas at higher loads when the turbine 15 produces more power than the blower 21 absorbs, the turboshaft 19 increases its speed and transmits the excess power by means of the torque converter 82 and the gear train 23—24 to the crankshaft 32, while the hydraulic coupling 28a idles by virtue of the one-way clutch 85.

If the gas turbine 15 in Fig. 9 has to furnish all the blower power, it cannot exceed the direct drive speed corresponding to the gear ratio from crankshaft 32 to turbine blower shaft 19 until it obtains excess power, whereas in the arrangement of Fig. 2 the gas turbine 15 drives only one stage 21 of the blowers, and will develop excess power much sooner so that it can speed up its blower and rapidly increase supercharging.

At low load and part load the crankshaft 32 has not only to furnish the power to drive the blower 21 in Fig. 9, but also to drive the turbine 15 at direct speed, causing useless ventilation losses, whereas in the arrangement of Fig. 2, at low and part load, the turbine blower shaft 19 idles or runs at a speed at which the low turbine power enables it to turn. Particularly for supercharging over a wide range of pressure and load variation, the arrangement of Fig. 2 presents advantages over the arrangement of Fig. 9. The supercharging can be more easily controlled and varied, and the fuel consumption at part load is better.

Increased back-pressure caused by the exhaust turbine produces increased supercharging of the engine. The back-pressure increases automatically with increased air and combustion gas delivery.

It is believed that the foregoing description conveys a good understanding of the objects and advantages of my invention. The appended claims have been drawn with a view to covering all legitimate modifications and adaptations.

I claim:

1. In combination, a two-cycle internal combustion engine having a power output shaft driven thereby, a scavenging and supercharging blower for said engine, means whereby said blower is arranged to be driven under pressure of the exhaust gases from said engine, means including a hydraulic coupling for driving the blower from the output shaft at starting and at intermediate load, and means including a hydraulic torque converter connecting the turbine with the output shaft to transmit excess power of the turbine at high loads to the output shaft.

2. In combination, an output shaft, an internal combustion engine for driving the same, a gas-turbine driven by the exhaust gases of the engine, and an air compressor for charging said engine driven by said turbine, a turbo-shaft connecting the turbine and compressor, and means for operatively connecting said turbo-shaft with the crankshaft of said engine, said means including a hydraulic coupling comprising two bladed wheels in fluid circuit relationship, a torque converter comprising a bladed impeller, a bladed turbine wheel, and a bladed reaction member in fluid circuit relationship, means drivingly connecting one bladed wheel of said coupling and the impeller of said converter with the turbo-shaft, and means including over-running clutch means for individually drivingly connecting the other bladed wheel of said coupling and the turbine wheel of said converter with the crankshaft of said engine, whereby the crankshaft is adapted to transmit drive to the turbo-shaft through said coupling but said turbo-shaft is adapted to transmit drive through said converter to said crankshaft.

3. In combination with an internal combustion engine and an output shaft driven thereby, a supercharging device for said engine, an exhaust turbine-driven scavenging and supercharging blower, a hydraulic coupling for driving said blower from said engine at starting and at part load, and a hydraulic torque convertor for transmitting excess power of the turbine to the output shaft at high load.

HEINRICH SCHNEIDER.

REFERENCES CITED

The following references are of record in the file of this patent:

UNITED STATES PATENTS

| Number | Name | Date |
| --- | --- | --- |
| 1,988,726 | Godron | Jan. 22, 1935 |
| 2,018,914 | Endres | Oct. 29, 1935 |
| 2,048,633 | Eweis | July 21, 1936 |
| 2,084,312 | Astafiev | June 22, 1937 |
| 2,089,590 | Wälti | Aug. 10, 1937 |
| 2,189,162 | Buck | Feb. 6, 1940 |
| 2,216,494 | Kurtz et al. | Oct. 1, 1940 |
| 2,278,181 | Lieberherr | Mar. 31, 1942 |
| 2,296,268 | Büchi | Sept. 22, 1942 |
| 2,297,235 | Müller | Sept. 29, 1942 |
| 2,375,006 | Larrecq | May 1, 1945 |
| 2,389,520 | Lapsley | Nov. 20, 1945 |

FOREIGN PATENTS

| Number | Country | Date |
| --- | --- | --- |
| 9,963 | Great Britain | Apr. 28, 1913 |
| 206,845 | Great Britain | Feb. 21, 1924 |
| 537,483 | Great Britain | June 24, 1941 |
| 435,928 | Germany | Oct. 20, 1926 |
| 684,902 | France | Mar. 24, 1930 |
| 696,369 | France | Oct. 14, 1930 |